(12) United States Patent
Bouillon et al.

(10) Patent No.: US 8,357,344 B2
(45) Date of Patent: Jan. 22, 2013

(54) GAS DEACIDIZING METHOD USING AN ABSORBENT SOLUTION WITH VAPORIZATION AND/OR PURIFICATION OF A FRACTION OF THE REGENERATED ABSORBENT SOLUTION

(75) Inventors: Pierre-Antoine Bouillon, Lyons (FR); Marc Jacquin, Lyons (FR)

(73) Assignee: IFP, Cedex (FR)

( * ) Notice: Subject to any disclaimer, the term of this patent is extended or adjusted under 35 U.S.C. 154(b) by 163 days.

(21) Appl. No.: 12/720,752

(22) Filed: Mar. 10, 2010

(65) Prior Publication Data

US 2011/0081287 A1   Apr. 7, 2011

(30) Foreign Application Priority Data

Mar. 10, 2009   (FR) ..................... 09 01091

(51) Int. Cl.
*B01D 53/52* (2006.01)
*B01D 53/62* (2006.01)
*C01B 35/12* (2006.01)
*C01B 25/30* (2006.01)
*C07C 275/00* (2006.01)

(52) U.S. Cl. ........ 423/220; 423/228; 423/232; 423/279; 423/280; 423/305; 423/419.1; 564/32; 564/63

(58) Field of Classification Search ............... 423/220, 423/226, 228, 229, 232, 279, 280, 305, 419.1; 564/32, 63

See application file for complete search history.

(56) References Cited

U.S. PATENT DOCUMENTS

| 4,251,494 A | 2/1981 | Say |
| 7,419,646 B2 * | 9/2008 | Cadours et al. ............ 423/220 |
| 2007/0148068 A1 | 6/2007 | Burgers et al. |

FOREIGN PATENT DOCUMENTS

| FR | 2 898 284 | 9/2007 |
| FR | 2 900 843 | 11/2007 |

OTHER PUBLICATIONS

Simtronics.com, "SPM-3100 Amine Treating Unit." (c) 2006. Viewed Sep. 11, 2012 at http://www.simtronics.com/catalog/spm/spm3100.htm .*

* cited by examiner

*Primary Examiner* — Daniel C McCracken
*Assistant Examiner* — Daniel Berns
(74) *Attorney, Agent, or Firm* — Antonelli, Terry, Stout & Kraus, LLP.

(57) ABSTRACT

The gaseous effluent to be treated is contacted in column C1 with an absorbent solution selected for its property of forming two separable phases when it is heated. The regenerated absorbent solution is separated into two phases in drum B1; a fraction rich in water and a fraction rich in reactive compounds.

Separation allows to optimize the operations performed on the regenerated absorbent solution. On the one hand, separation allows to carry out vaporization, through reboiler R1, of a fraction of the absorbent solution, preferably containing a limited reactive compound concentration in relation to the absorbent solution, thus limiting their degradation. On the other hand, separation of the phases allows to reduce the amount of solution to be treated in order to remove the non-regeneratable salts and thus to reduce the costs linked with their elimination. Finally, separation allows to eliminate the degradation products by carrying out a specific and suitable purification for each phase.

The method can be applied to combustion fumes decarbonation and to natural gas or synthesis gas deacidizing.

19 Claims, 5 Drawing Sheets

GAS DEACIDIZING METHOD USING AN ABSORBENT SOLUTION WITH VAPORIZATION AND/OR PURIFICATION OF A FRACTION OF THE REGENERATED ABSORBENT SOLUTION

FIELD OF THE INVENTION

The present invention relates to the field of deacidizing a gaseous effluent by means of an absorbent solution.

The method according to the invention allows to remove acid compounds such as carbon dioxide ($CO_2$) and hydrogen sulfide ($H_2S$) contained in a gaseous effluent. It can be applied for treating a natural gas, a synthesis gas or fumes from a combustion process.

BACKGROUND OF THE INVENTION

Document FR-2,898,284 aims to use a demixing absorbent solution having the property of splitting up when said absorbent solution laden with acid compounds is heated. The absorbent solution is contacted with the gas to be deacidized. During regeneration, the solution divides into two phases: a fraction rich in acid compounds and a fraction poor in acid compounds. Thus, document FR-2,898,284 aims to regenerate by distillation only the fraction that is enriched in acid compounds in order to minimize the energy required for regeneration of the absorbent solution.

However, thermal regeneration of the absorbent solution favours degradation of the organic compounds contained in the absorbent solution. The organic compounds degrade upon passage through the reboiler that provides the thermal energy required for regeneration. It is the part of the process where the operating conditions are the severest. Furthermore, in the case of combustion fumes treatment, for example thermal power plant fumes, the presence of oxygen can generate other degradation reactions. Under these combined effects, organic degradation products and non-regeneratable salts accumulate within the absorbent solution. This accumulation alters the properly of acid gas absorption by the absorbent solution. Besides, the organic degradation products can have a surface-active nature. Thus, they can pose foaming problems, or liquid-liquid separation problems by stabilizing the phases in form of an emulsion. These liquid-liquid separation problems can be encountered when using the method described in document FR-2,898,284 or in the case of gas treatment where the liquid hydrocarbons are eliminated from the absorbent solution by liquid-liquid separation, after the absorption column. Furthermore, non-regeneratable salts are known to be responsible for corrosion and foaming problems within the units.

In order to limit these problems, the absorbent solution is generally purified by ion exchange or by distillation, in a sequential or continuous manner. Within the context of purification through ion exchange, ion-exchange resins are used to replace the non-regeneratable salts by hydrogenocarbonates that are regeneratable. In the case of purification by distillation, the water and the reactive compounds are vaporized and sent back to the capture unit, thus allowing the weakly volatile organic degradation products and the non-regeneratable salts to accumulate in the bottom of the distillation drum. They are thereafter eliminated. Besides, when the reactive compounds are weakly volatile, it may be difficult to vaporize the absorbent solution at atmospheric pressure. The absorbent solution is then subjected to purification by vacuum distillation, which is more expensive than distillation at atmospheric pressure, in order to limit the distillation temperature. Despite this distillation temperature decrease, degradations still may occur during this purification operation. The faster the degradation of the absorbent solution, the higher the frequency of the purification operations to guarantee constant performances of the absorbent solution, and maximum non-regeneratable salt concentration in the solution. These purification operations have a quite significant impact on the operating costs of the unit. Finally, since the purification operations through ion exchange or distillation do not allow to remove all of the organic degradation products, it may be necessary to periodically renew all of the absorbent solution when its performances are too low. The costs associated with the purchase of a new solvent feed and with the elimination of the degraded absorbent solution feed are high.

The present invention aims to optimize the operations performed on the absorbent solution by carrying out separation of the regenerated absorbent solution into two fractions: a fraction enriched in water and a fraction enriched in reactive compounds.

SUMMARY OF THE INVENTION

In general terms, the invention describes a method of deacidizing a gaseous effluent comprising at least one acid compound of the group made up of hydrogen sulfide ($H_2S$) and carbon dioxide ($CO_2$), wherein the following stages are carried out:
  a) contacting the gaseous effluent with an absorbent solution in a contacting zone so as to obtain a gaseous effluent depleted in acid compounds and an absorbent solution laden with acid compounds, the absorbent solution being selected for its property of forming two separable liquid fractions when it is heated,
  b) regenerating the absorbent solution laden with acid compounds in a regeneration zone so as to release the acid compounds in gaseous form and to obtain a regenerated absorbent solution,
  c) carrying out a stage of separation of a portion of the regenerated solution into a fraction enriched in water and fraction enriched in reactive compounds,
  d) carrying out at least one of the following operations:
    i) vaporizing at least part of the water-enriched fraction so as to produce a vapour that is fed into the regeneration zone,
    ii) carrying out an operation of purification of the water-enriched fraction so as to produce a purified fraction that is fed into the regeneration zone,
    iii) carrying out an operation of purification of the fraction enriched in reactive compounds so as to produce a purified fraction that is fed into the regeneration zone.

According to the invention, operation i) can be carried out using a reboiler.

One of the following techniques can be implemented for operation ii): adsorption, ion exchange, distillation.

One of the following techniques can be implemented for operation adsorption, distillation.

After operation i) or ii), the water-enriched fraction can be sent to the contacting zone or to the regeneration zone.

After operation iii), the fraction enriched in reactive compounds can be sent to the contacting zone or to the regeneration zone.

Prior to stage b), the absorbent solution laden with acid compounds can be heated, a stream depleted in acid compounds can be separated from the absorbent solution and this stream can be recycled by feeding it into the contacting zone.

The absorbent solution laden with acid compounds can be heated to a temperature ranging between 50° C. and 150° C.

A second portion of the regenerated absorbent solution can be recycled by feeding it into the contacting zone.

In stage c), one of the following separation techniques can be used: decantation, centrifugation, filtration.

The absorbent solution can comprise a reactive compound in aqueous phase, the reactive compound being selected from the group consisting of: amines, alkanolamines, polyamines, amino-acids, amino-acid alkaline salts, amides, ureas, alkali metal phosphates, carbonates and borates.

The gaseous effluent can be selected from the group made up of natural gas, synthesis gas, combustion fumes, refinery gas, Claus tail gas and biomass fermentation gas.

Separation allows to optimize the operations carried out on the regenerated absorbent solution. On the one hand, separation of the regenerated absorbent solution into two fractions allows to carry out vaporization by the reboiler of a fraction of the absorbent solution, preferably containing a limited reactive compound concentration in relation to the absorbent solution, thus limiting their degradation. On the other hand, separation allows to reduce the amount of solution to be treated in order to remove the non-regeneratable salts and thus to reduce the costs linked with the elimination of the non-regeneratable salts. Finally, separation allows to eliminate the degradation products by carrying out a specific and suitable purification for each fraction.

BRIEF DESCRIPTION OF THE FIGURES

Other features and advantages of the invention will be clear from reading the description hereafter, with reference to the accompanying figures wherein.

DETAILED DESCRIPTION

Figure 1:
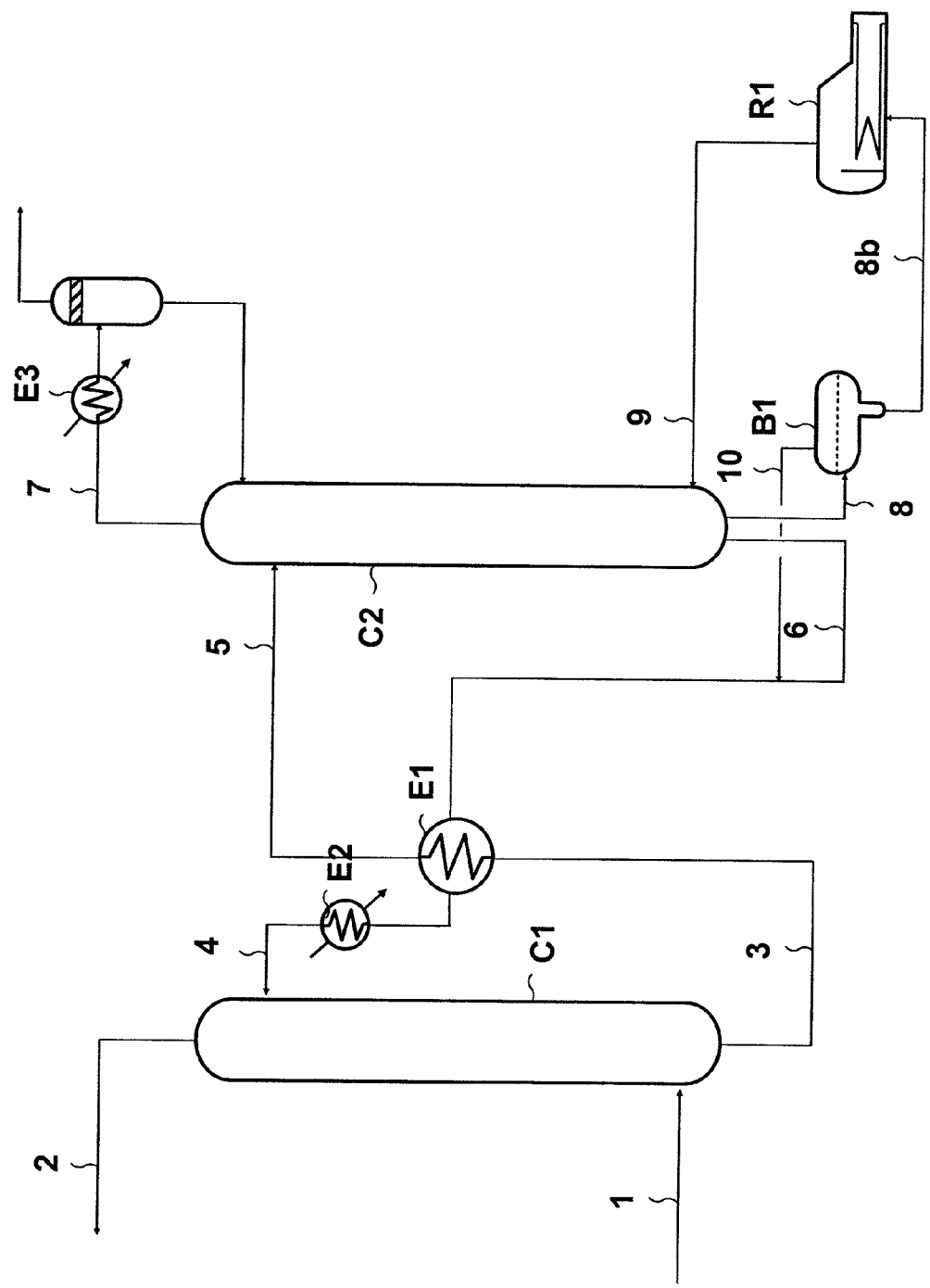
FIG. 1 shows a first embodiment of the method according to the invention.

With reference to FIG. 1, the gaseous effluent to be deacidized circulating in line 1 is contacted in absorption column C1 with the absorbent solution flowing in through line 4. Column C1 is equipped with gas/liquid contacting internals, for example distillation trays, a random or a stacked packing.

The deacidizing method according to the invention can be applied to various gaseous effluents. For example, the method allows to decarbonate combustion fumes, to deacidize natural gas or a Claus tail gas. The method also allows to remove the acid compounds contained in synthesis gas, in conversion gas in integrated coal or natural gas combustion plants, and in the gas resulting from biomass fermentation.

In column C1, the reactive compounds of the absorbent solution react with the acid compounds so as to form a salt soluble in the solution. The gas depleted in acid compounds is discharged from C1 through line 2. The absorbent solution enriched in acid compounds, in form of salts dissolved in water, is discharged from C1 through line 3.

The absorbent solution is an aqueous solution comprising one or more reactive compounds and/or having a physico-chemical affinity with acid compounds. An absorbent solution comprising compounds that react in a reversible manner with acid compounds such as $H_2S$ and $CO_2$ is selected.

According to the invention, one selects reactive compounds having a physico-chemical affinity with the acid compounds having the property of forming two separable liquid phases when the temperature is above a critical temperature. In other words, the reactive compounds are selected in such a way that the absorbent solution forms two liquid phases when its temperature exceeds a critical demixing temperature, i.e. a temperature threshold. The composition of the absorbent solution used in the method according to the invention is detailed hereafter.

The absorbent solution is then sent to heat exchanger E1. It leaves the exchanger at a higher temperature through line 5.

The absorbent solution from E1 is fed through line 5 into column C2 to be regenerated by distillation or steaming of the acid compounds, an operation commonly referred to as stripping. Column C2 is equipped with a reboiler R1 and with gas/liquid contacting internals. In C2, the absorbent solution is contacted with steam that is generated by reboiler R1 and fed to the bottom of C2. In C2, under the effect of contacting with steam, the acid compounds are separated from the reactive compounds of the absorbent solution. The acid compounds are released in gaseous form and discharged from C2 through line 7. Steam stream 7 rich in acid compounds is partly condensed by cooling in E3 and the condensates are sent to the top of C2 as reflux.

Part of the regenerated absorbent solution collected in the bottom of C2 is discharged through line 6 and again fed into column C1. The heat released through cooling of the absorbent solution collected in the bottom of column C2 can be recovered for heating various streams to be regenerated. For example, with reference to FIG. 1, the absorbent solution circulating in line 6 allows to heat, in heat exchanger E1, the absorbent solution laden with acid compounds circulating in line 3. This solution is then cooled by exchanger E2 to the operating temperature of column C1, then it is fed into C1 through line 4.

Figure 1B:
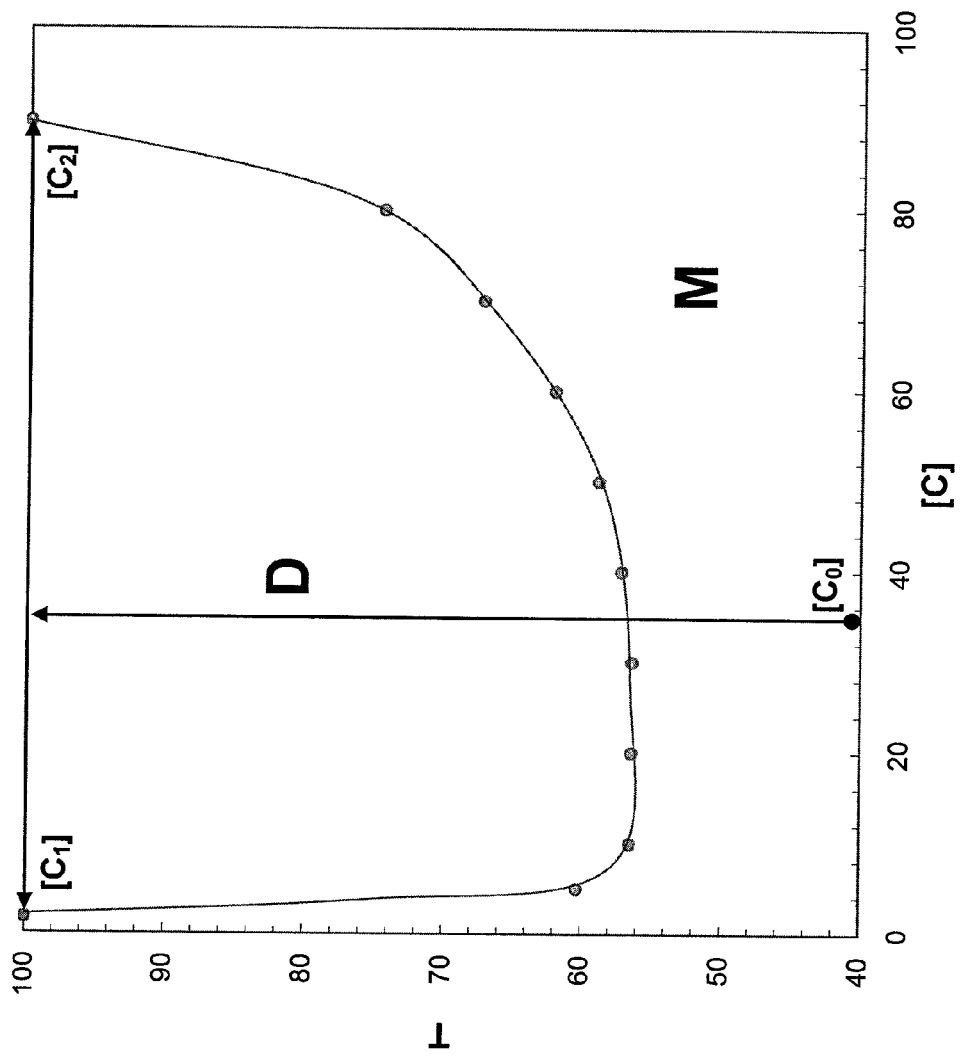
FIG. 1b shows the evolution of the critical demixing temperature versus absorbent solution composition curve, FIG. 2 diagrammatically shows a variant of the first embodiment of the invention.

According to the invention, another part of the absorbent solution is withdrawn from the bottom of column C2 through line 8 and fed into separation drum B1. The absorbent solution is at a higher temperature than the critical temperature at which the absorbent solution divides into two fractions: a fraction rich in reactive compounds and a fraction rich in water. In device B1, the absorbent solution can be separated by decantation, centrifugation or filtration. B1 allows to separate the water-rich fraction from the fraction rich in reactive compounds. The separation operation in B1 can optionally be carried out at a different pressure than the pressure in C2 so as to facilitate said separation stage. FIG. 1b illustrates the demixing phenomenon.

FIG. 1b shows an example of evolution of the critical demixing temperature T as a function of the concentration (C) in reactive compound TMHDA (N,N,N',N'-Tetramethylhexane-1,6-diamine) for an absorbent solution consisting of TMHDA in aqueous solution, that has absorbed no acid compounds. Domain M indicates the temperature and concentration conditions for which the absorbent solution is a single-phase solution. Domain D indicates the temperature and concentration conditions for which the absorbent solution is a two-phase solution. At high temperature, the absorbent solution of global reactive compound concentration ($C_0$) is a two-phase solution (zone D) and it divides into two phases, one poor in reactive compounds (reactive compound concentration ($C_1$)) and the other rich in reactive compounds (reactive compound concentration ($C_2$)).

According to the invention, the water-rich fraction is discharged from B1 through line 8b and fed into reboiler R1 in order to be entirely or partly vaporized. Vaporization in R1 is carried out through heating. The entirely or partly vaporized stream produced by R1 is sent through line 9 to the bottom of column C2 to carry out thermal regeneration of the absorbent solution.

Sending only the water-rich fraction 8b to the reboiling operation in R1 allows to reduce the degradation of the reactive compounds in the hot zone of reboiler R1.

The second liquid fraction enriched in reactive compounds is discharged from B1 through line 10 and mixed with the absorbent solution stream circulating in line 6.

The nature of the reactive compounds of the absorbent solution can be selected depending on the nature of the acid compound(s) to be treated to allow a reversible chemical reaction with the acid compound(s) to be treated.

The reactive compounds can be, by way of non limitative example, (primary, secondary, tertiary, cyclic or not, aromatic or not, saturated or not) amines, alkanolamines, polyamines, amino-acids, amino-acid alkaline salts, amides, ureas, alkali metal phosphates, carbonates or borates.

For example, the following reactive compound can be used: N,N,N',N'-Tetramethylhexane-1,6-diamine, commonly referred to as TMHDA.

The reactive compounds can be in variable concentration, for example ranging between 10 wt. % and 90 wt. %, preferably between 15 wt. % and 60 wt. %, more preferably between 20 wt. % and 50 wt. %, in the aqueous solution.

The absorbent solution can contain between 10 wt. % and 90 wt. % of water.

In an embodiment, the reactive compounds of the absorbent solution can be mixed with another amine, containing at least one primary or secondary amine function so as to act as an activator. The absorbent solution can contain activator up to a concentration of 20 wt. %, preferably less than 15 wt. % and more preferably less than 10 wt. %.

This type of formulation is particularly interesting in the case of $CO_2$ capture in industrial fumes, or treatment of natural gas containing $CO_2$ above the desired specification. In fact, for this type of application, one wants to increase the $CO_2$ capture kinetics in order to reduce the size of the equipments.

A non-exhaustive list of compounds that can be used as activators is given below:
MonoEthanolAmine,
AminoEthylEthanolAmine,
DiGlycolAmine,
piperazine,
N-(2-HydroxyEthyl)piperazine,
N-(2-AminoEthyl)piperazine,
N-Methylpiperazine,
N-Ethylpiperazine,
N-Propylpiperazine,
1,6-HexoneDiAmine,
1,1,9,9-TetraMethylDiPropyleneTriamine,
Morpholine,
Piperidine,
3-(MelylAmino)PropylAmine,
N-MethylBenzylAmine.

In an embodiment, the absorbent solution, in particular on absorbent solution based on N,N,N',N'-Tetramethylhexane-1,6-diamine, can also contain other organic compounds. Thus, the absorbent solution according to the invention can contain organic compounds that are not reactive towards acid compounds (commonly referred to as "physical solvent") and that allow to increase the solubility of at least one or more acid compounds of the gaseous effluent. For example, the absorbent solution can comprise between 5 wt. % and 50 wt. % of physical solvent such as alcohols, glycol ethers, lactames, N-pyrrolidones, N-alkylated piperidones, cyclotetramethylenesulfones, N-alkylformamides, N-alkylacetamides, etherketones or alkyl phosphates and derivatives thereof. By way of non limitative example, it can be methanol, tetraethyleneglycoldimethylether, sulfolane or N-formyl morpholine.

In an embodiment, the absorbent solution, in particular an absorbent solution based on N,N,N',N'-Tetramethylhexane-1,6-diamine, can also comprise an organic or inorganic acid. A non-exhaustive list of acid compounds that can be used is given below:
formic acid
oxalic acid
acetic acid
propanoic acid
butanoic acid
amino-acid (Glycine, Taurine, etc.)
phosphoric acid
phosphorous acid
pyrophosphoric acid
sulfuric acid
sulfurous acid
nitrous acid
hydrochloric acid.

Figure 2:
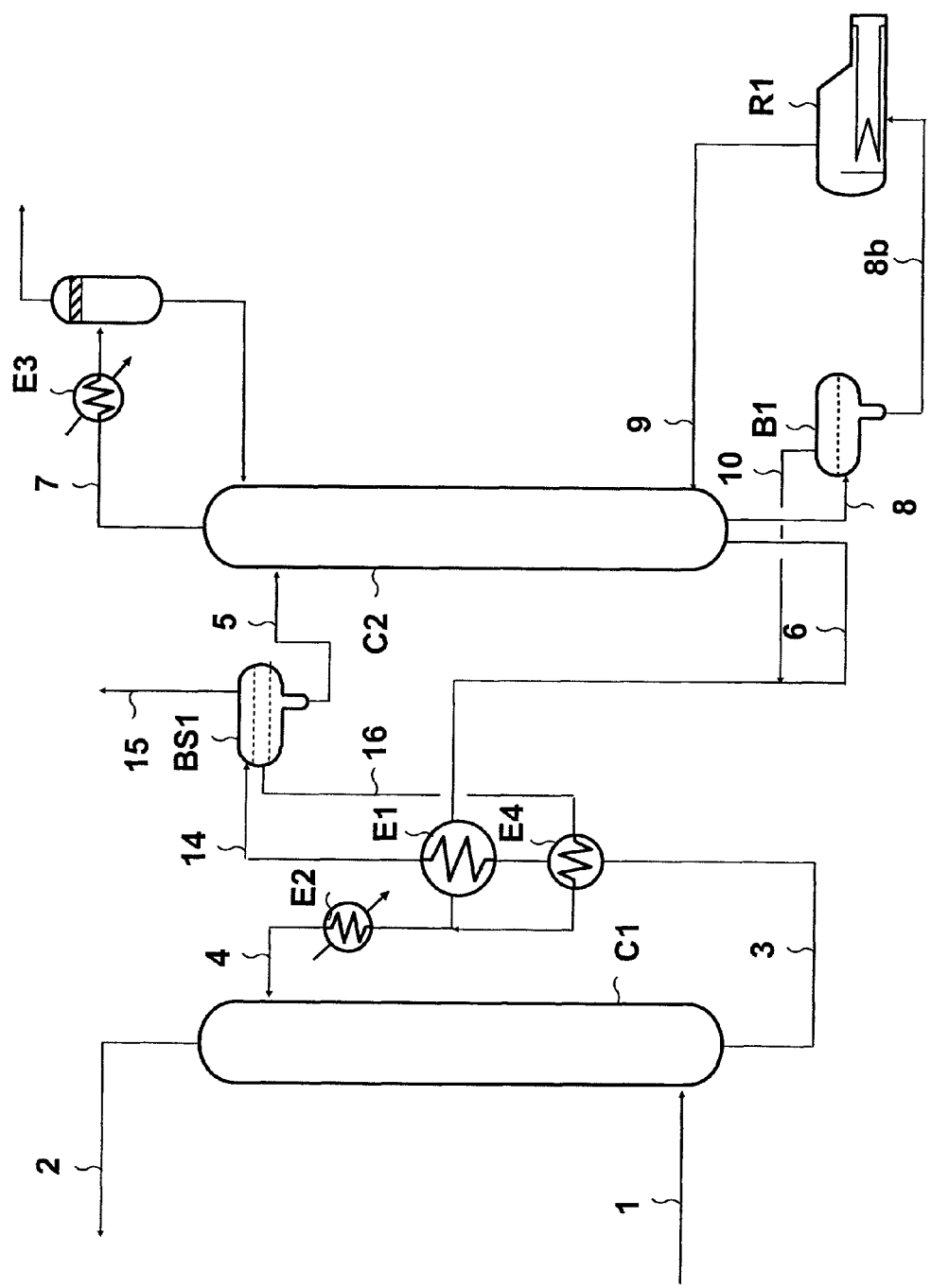

The process diagrammatically shown in FIG. 1 can be complemented by carrying out an absorbent solution separation stage upstream from column C2, as shown in FIG. 2. The reference numbers of FIG. 2 identical to those of FIG. 1 designate the same elements.

With reference to FIG. 2, the absorbent solution laden with acid compounds obtained at the bottom of C1 is heated in E4 and E1. It leaves E1 through line 14 at a higher temperature. In exchanger E1, the absorbent solution laden with acid compounds is heated to a higher temperature than the critical temperature at which the solution laden with acid compounds forms two separable liquid phases. For example, the absorbent solution laden with acid compounds is heated to a temperature ranging between 50° C. and 150° C., preferably between 70° C. and 120° C. Thus, the fluid circulating in line 14 consists of two separable liquid phases: a phase rich in acid compounds and a phase poor in acid compounds. Furthermore, under the effect of the temperature rise, part of the acid compounds is released in gas form. The three phases of the fluid circulating in line 14 are separated in separation drum BS1. For example, the two liquid phases are separated in BS1 by decantation, centrifugation or filtration. The gas fraction at the top of BS1 is extracted through line 15 and possibly mixed with stream 7. The first liquid fraction enriched in acid compounds, i.e. enriched in active compounds that have reacted with the acid compounds, is sent through line 5 to regeneration column C2. The second liquid fraction depleted in acid compounds, i.e. enriched in unreacted active compounds, is discharged from BS1 through line 16 and cooled in E4. With reference to FIG. 2, liquid fraction 16 is fed into column C1 while being mixed with the absorbent solution portion circulating in line 4.

The process of FIG. 1 can be complemented by purification operations carried out in units P1 and P2. The reference numbers of FIG. 3 identical to those of FIG. 1 designate the same elements.

The water-rich fraction of absorbent solution coming from B1 through line 8b can also be fed through line 11 into purification unit P1 in order to perform specific purification of the fraction depleted in reactive compounds. Various purification techniques can be implemented in unit P1.

The purification process carried out in unit P1 can be, for example, elimination through adsorption of the organic degradation products soluble in the aqueous phase, for example in a column filled with activated carbon. In this embodiment, a purification that would not be efficient if all of the absorbent solution were fed into the purification unit is performed. In fact, adsorption of the reactive compounds, at a higher concentration than the degradation products, would be privileged.

The purification process in unit P1 can be for example an ion exchange technique for eliminating the non-regeneratable salts, for example in a column filled with an anion exchange resin. The non-regeneratable salts are converted by ion exchange to hydrogenocarbonates that are regeneratable. In this embodiment, the flow rate of solvent to be treated is reduced, thus reducing the size of the equipments and the associated operating costs. In fact, the non-regeneratable salts concentrate in the water-rich fraction, which allows to treat only a limited fraction of the absorbent solution during this purification stage.

Purification unit P1 can also be a distillation column for eliminating the non-regeneratable salts and the weakly volatile degradation products soluble in the water-rich phase. Addition of a strong base through stream 17, soda or potash for example, can optionally be performed in order to neutralize the amine salts. In this embodiment, thermal degradation reactions of the reactive compounds present at low concentration in the water-rich fraction are limited. Besides, the low reactive compound concentration also allows to do without a vacuum distillation generally used to achieve low-temperature purification. Finally, the flow rate of solvent to be treated is reduced, thus reducing the size of the equipments.

The water-rich fraction purified in P1 is fed into C2 through line 13, then 9, while the separated products are discharged from the process through line 12. Alternatively, the water-rich fraction purified in P1 can optionally be mixed with the stream circulating in line 4 so as to be fed into C1 if the purification operation in P1 is carried out at low temperature.

The absorbent solution fraction rich in reactive compounds coming from B1 through line 10 can be entirely or partly fed through stream 18 into a purification unit P2 in order to achieve specific purification of the fraction enriched in reactive compounds. Various purification techniques can be used in unit P2.

Purification process P2 can be, for example, elimination by adsorption of the organic degradation products soluble in the phase rich in reactive compounds, for example by passage of stream 18 through a column filled with activated carbon, a zeolite, an alumina, activated or not, earths (days for example), a silica, etc. In this embodiment, a purification that would not be efficient if all of the absorbent solution were fed into the purification unit is carried out. In the case of a zeolite, for example, the adsorption of the water molecules, more polar and present at higher concentration than the degradation products, would be privileged. The fraction rich in reactive compounds thus purified is fed again into C2 through line 19.

Alternatively, purification unit P2 can be a reactive compound distillation column for example. Depending on the volatility of the reactive compounds, this distillation can be carried out under vacuum or at atmospheric pressure. The distillation cut corresponding to the reactive compounds is fed again into C2 through line 19, while the more volatile and the less volatile products are discharged from the process through line 20.

Figure 3:
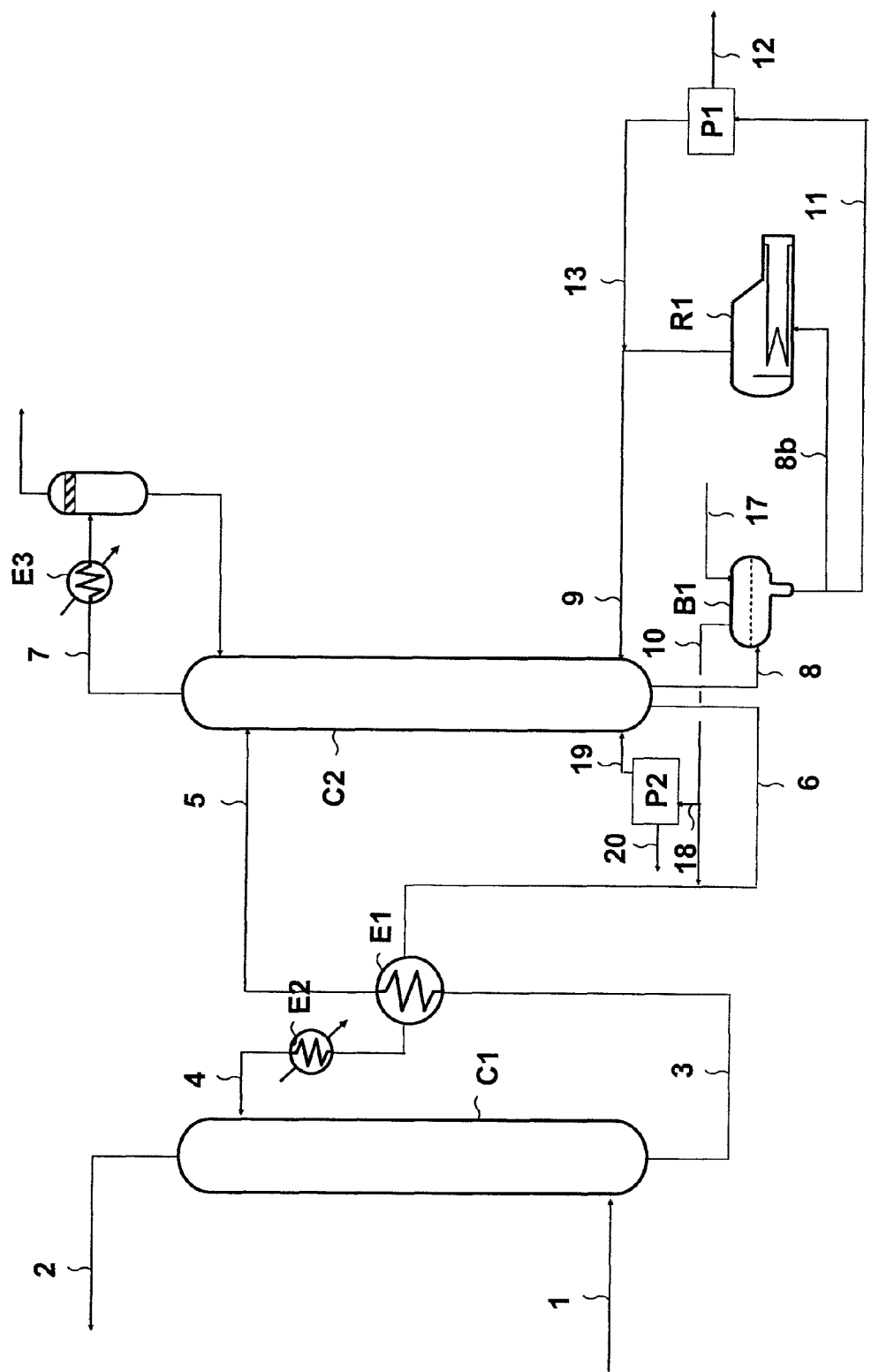
FIGS. 3 and 4 show other embodiments of the method according to the invention.

In the process diagrammatically shown in FIG. 3, unit P1 can be operated without operating unit P2, or unit P2 can be operated without operating unit P1, or units P1 and P2 can be operated simultaneously.

Figure 4:
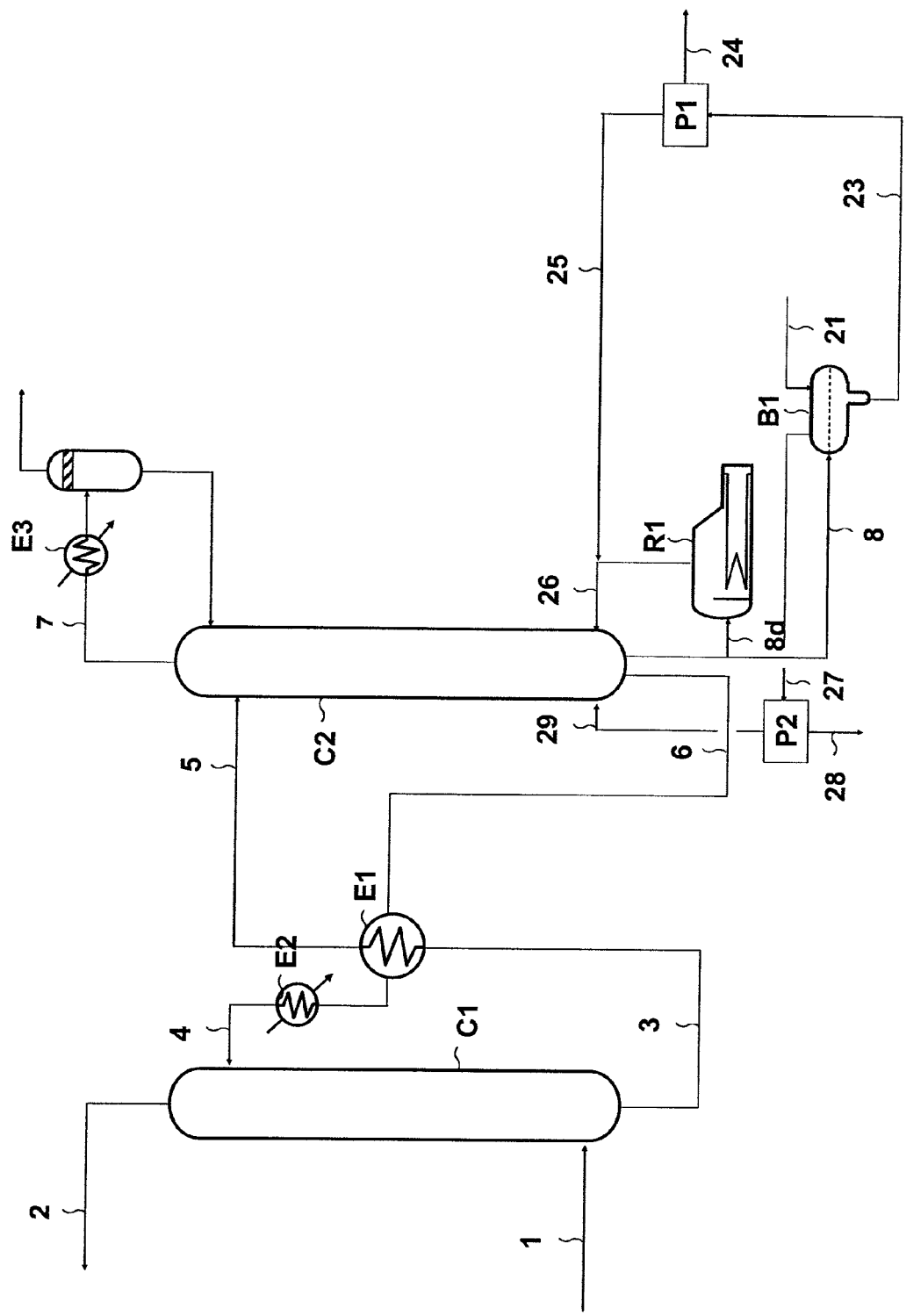

A variant of the invention is described with reference to FIG. 4. The reference numbers of FIG. 4 identical to those of FIG. 3 designate the same elements. In the process of FIG. 4, the operation of columns C1 and C2 is similar to that of FIG. 3. On the other hand, the variant of the process of FIG. 4 lies in the reboiler of column C2 and in purification units P1 and P2.

A portion of the absorbent solution discharged at the bottom of C2 through line 8 is fed into separation device B1. Another portion of the absorbent solution discharged at the bottom of C2 through line 8d is heated in reboiler R1 so as to achieve regeneration of the absorbent solution. The stream vaporized in R1 is fed into C2 through line 26. After thermal regeneration in C2, the absorbent solution is at a higher temperature than the critical temperature at which the absorbent solution divides into two fractions: a fraction rich in reactive compounds and a fraction rich in water.

The non-regeneratable salts concentrate in the water-rich fraction. Besides, injection of a strong base through stream 21, soda or potash for example, allows to release and to separate in B1 the fraction of reactive compounds trapped in the water-rich phase in form of salts. The aqueous fraction containing the salts neutralized in B1 is sent to purification unit P1 through line 23. The purification techniques implemented in unit P1 of FIG. 4 are identical to those described with reference to unit P1 of FIG. 3. With reference to FIG. 4, the stream purified in P1 is sent through line 25, then 26 to the bottom of column C2, and the non-regeneratable salts or other degradation products are discharged from P1 through line 24. Alternatively, the stream purified in P1 can be fed through line 25 into column C1.

The fraction rich in reactive compounds is sent through stream 27 to purification unit P2. The purification techniques implemented in unit P2 of FIG. 4 are identical to those described with reference to unit P2 of FIG. 3. With reference to FIG. 4, the purified fraction rich in reactive compounds is then sent back to C2 through line 29 and the separated degradation products are discharged through line 28. Alternatively, the purified fraction rich in reactive compounds discharged from P2 through line 29 can be fed into C1.

In the process described with reference to FIG. 4, units P1 and P2 can be used simultaneously. Alternatively, unit P1 can be used while unit P2 is inactive. In this case, the stream circulating in line 27 can be directly injected, via line 6, into absorption column C1. Alternatively, unit P2 can be used while unit P1 is inactive. In this case, stream 23 can be directly injected into reboiler R1 or in the bottom of column C2, or into column C1 via line 6.

The separation operation in B1 can optionally be performed at a different pressure than the pressure in C2 so as to facilitate said separation stage.

The processes diagrammatically shown in FIGS. 3 and 4 can be complemented by carrying out an absorbent solution separation stage upstream from column C2, as shown in drum BS1 in FIG. 2.

The method and its advantages according to the present invention are is illustrated by the operating example below.

The example provided relates to the process described with reference to FIG. 4, using a 50 wt. % TMHDA aqueous solution. We are in the perspective of elimination of the non-regeneratable salts that form in a $CO_2$ capture unit. The latter are mainly formate ions and, in much smaller amount, glycolate ions, oxalate ions, acetate ions or propionate ions of protonated amine. We only consider the formate ions hereafter. In cases where the concentration of protonated amine formlates in solution should reach 1.5 wt. %, a purification operation would be hypothetically necessary to limit foaming or corrosion problems. In the bottom of column C2, the absorbent solution is a two-phase solution because its temperature is above the critical temperature. The two fractions can thus be separated in decanter B1. The composition of the two fractions is given in the table below, in the case where the temperature of decanter B1 is about 90° C.

|  | Fraction rich in reactive compounds | Water-rich fraction |
|---|---|---|
| Free TMHDA | 87.6 wt. % | 1 wt. % |
| Water | 12.4 wt. % | 95.7 wt. % |
| Protonated amine formiate | 0 wt. % | 3.3 wt. % |
| Sodium formiate | 0 wt. % | 0 wt. % |

In separation device B1, soda can be fed through stream 21 in order to exchange the protonated amine with sodium cations for example. After addition of soda in a proportion of one equivalent in relation to the formiate ions, the composition of the two phases is given in the table below, in the case where the temperature of decanter B1 is about 90° C.

|  | Phase rich in reactive compounds | Water-rich phase |
|---|---|---|
| Free TMHDA | 87.8 wt. % | 1 wt. % |
| Water | 12.2 wt. % | 97.3 wt. % |
| Protonated amine formiate | 0 wt. % | 0 wt. % |
| Sodium formiate | 0 wt. % | 1.7 wt. % |

The water-rich phase represents approximately 45 wt. % of the absorbent solution, whereas the phase rich in reactive compounds represents approximately 55 wt. % of the absorbent solution. Since the latter contains no formiate ions, it can be optionally sent through line 27 to purification, then through line 29 to the bottom of absorption column C2. The water-rich phase containing the sodium formiate ions can be sent to the distillation unit through stream 23. Considering the liquid-liquid separation achieved upstream in B1, the distillation equipment is approximately twice as small, compared with the reference case where all of the absorbent solution is sent to distillation. Besides, the flow rate of the solution to be vaporized has been divided by two, which reduces the energy consumption associated with this purification stage. Furthermore, the solution to be vaporized only contains a very small proportion of amine: it is therefore not necessary to carry out vacuum distillation, which would have been necessary if all of the absorbent solution had been sent to distillation (the amine would represent 50 wt. % of the solution with a standard boiling temperature of 210° C.). Finally, degradation of the amine in this purification stage is limited considering the low amine concentration (1 wt. % amine) in the aqueous phase that is distilled.

The invention claimed is:

1. A method of deacidizing a gaseous effluent comprising at least one acid compound of the group made up of hydrogen sulfide and carbon dioxide, wherein the following stages are carried out:
   a) contacting a gaseous effluent with an absorbent solution in a contacting zone so as to obtain a gaseous effluent depleted in acid compounds and an absorbent solution laden with acid compounds, the absorbent solution being selected for its property of forming two separable liquid fractions when it is heated,
   b) regenerating the absorbent solution laden with acid compounds in a regeneration zone so as to release the acid compounds in gaseous form and to obtain a regenerated absorbent solution,
   c) carrying out a stage of separation of a portion of the regenerated solution into a fraction enriched in water and a fraction enriched in reactive compounds,
   d) carrying out at least one of the following operations:
      i) vaporizing at least a part of the fraction enriched in water so as to produce a vapour that is fed into the regeneration zone,
      ii) carrying out an operation of purification of the fraction enriched in water so as to produce a purified fraction that is fed into the regeneration zone,
      iii) carrying out an operation of purification of the fraction enriched in reactive compounds so as to produce a purified fraction that is fed into the regeneration zone.

2. A method as claimed in claim 1, wherein operation i) is carried out using a reboiler.

3. A method as claimed in claim 1, wherein one of the following techniques is implemented in operation ii): adsorption, ion exchange, distillation.

4. A method as claimed in claim 1, wherein one of the following techniques is implemented in operation iii): adsorption, distillation.

5. A method as claimed in claim 1, wherein a second portion of the regenerated absorbent solution is recycled by being fed into the contacting zone.

6. A method as claimed in claim 1 wherein, in stage c), one of the following separation techniques is used: decantation, centrifugation, filtration.

7. A method as claimed in claim 1, wherein the absorbent solution comprises a reactive compound in aqueous phase, the reactive compound being selected from the group consisting of: amines, alkanolamines, polyamines, amino-acids, amino-acid alkaline salts, amides, ureas, alkali metal phosphates, carbonates and borates.

8. A method as claimed in claim 1, wherein the gaseous effluent is selected from the group consisting of natural gas, synthesis gas, combustion fumes, refinery gas, Claus tail gas and biomass fermentation gas.

9. A method as claimed in claim 1 wherein, prior to stage b), the absorbent solution laden with acid compounds is heated, a stream depleted in acid compounds is separated from the absorbent solution and the stream is recycled by feeding it into contacting zone.

10. A method as claimed in claim 9, wherein the absorbent solution laden with acid compounds is heated to a temperature ranging between 50° C. and 150° C.

11. A method of deacidizing a gaseous effluent comprising at least one acid compound of the group made up of hydrogen sulfide and carbon dioxide, wherein the following stages are carried out:
   a) contacting a gaseous effluent with an absorbent solution in a contacting zone so as to obtain a gaseous effluent depleted in acid compounds and an absorbent solution laden with acid compounds, the absorbent solution being selected for its property of forming two separable liquid fractions when it is heated,
   b) heating the absorbent solution laden with acid compounds so as to obtain an absorbent solution liquid fraction rich in acid compounds and an absorbent solution liquid fraction depleted in acid compounds,
   c) recycling the absorbent solution liquid fraction depleted in acid compounds to the contacting zone, d) regenerating the absorbent solution liquid fraction rich in acid compounds in a regeneration zone so as to release the acid compounds in gaseous form and to obtain a regenerated absorbent solution, e) carrying out a stage of separation of a portion of the regenerated solution into a fraction enriched in water and a fraction enriched in reactive compounds, f) carrying out at least one of the following operations:
   i) vaporizing at least a part of the fraction enriched in water so as to produce a vapour that is fed into the regeneration zone,
   ii) carrying out an operation of purification of the fraction enriched in water so as to produce a purified water fraction that is fed into the regeneration zone,
   iii) carrying out an operation of purification of the fraction enriched in reactive compounds so as to produce a purified reactive compounds fraction that is fed into the regeneration zone.

12. A method as claimed in claim 11, wherein operation i) is carried out using a reboiler.

13. A method as claimed in claim 11, wherein one of the following techniques is implemented in operation ii): adsorption, ion exchange, distillation.

14. A method as claimed in claim 11, wherein one of the following techniques is implemented in operation iii): adsorption, distillation.

15. A method as claimed in claim 11, wherein, in stage b), the absorbent solution laden with acid compounds is heated to a temperature ranging between 50° C. and 150° C.

16. A method as claimed in claim 11, wherein a second portion of the regenerated absorbent solution is recycled by being fed into the contacting zone.

17. A method as claimed in claim 11 wherein, in stage e), one of the following separation techniques is used: decantation, centrifugation, filtration.

18. A method as claimed in claim 11, wherein the absorbent solution comprises a reactive compound in aqueous phase, the reactive compound being selected from the group consisting of: amines, alkanolamines, polyamines, amino-acids, amino-acid alkaline salts, amides, ureas, alkali metal phosphates, carbonates and borates.

19. A method as claimed in claim 11, wherein the gaseous effluent is selected from the group consisting of natural gas, synthesis gas, combustion fumes, refinery gas, Claus tail gas and biomass fermentation gas.

* * * * *